US010771739B2

(12) United States Patent
Kasahara et al.

(10) Patent No.: US 10,771,739 B2
(45) Date of Patent: Sep. 8, 2020

(54) INFORMATION PROCESSING DEVICE AND INFORMATION PROCESSING METHOD

(71) Applicant: Sony Corporation, Tokyo (JP)

(72) Inventors: Shunichi Kasahara, Kanagawa (JP); Junichi Rekimoto, Kanagawa (JP); Jun Kimura, Kanagawa (JP); Taizo Shirai, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 16/381,593

(22) Filed: Apr. 11, 2019

(65) Prior Publication Data
US 2019/0238793 A1 Aug. 1, 2019

Related U.S. Application Data

(62) Division of application No. 15/760,060, filed as application No. PCT/JP2016/070483 on Jul. 11, 2016, now abandoned.

(30) Foreign Application Priority Data

Sep. 30, 2015 (JP) ................................. 2015-195193

(51) Int. Cl.
H04N 7/14 (2006.01)
G06F 3/0484 (2013.01)
(Continued)

(52) U.S. Cl.
CPC ........... H04N 7/147 (2013.01); G06F 3/0484 (2013.01); G06F 16/00 (2019.01);
(Continued)

(58) Field of Classification Search
USPC ................... 455/550.01; 348/14.01–14.09
See application file for complete search history.

(56) References Cited

U.S. PATENT DOCUMENTS 8,874,474 B2    10/2014  Wakai et al.
9,298,283 B1 *  3/2016   Lin ................... G06F 3/0346
(Continued)

FOREIGN PATENT DOCUMENTS

CN    101163160 A    4/2008
CN    102651772 A    8/2012
(Continued)

OTHER PUBLICATIONS

International Search Report corresponding to PCT/ JP2016/070483, dated Sep. 20, 2016 (3 pgs.).
(Continued)

Primary Examiner — Maria El-Zoobi
(74) Attorney, Agent, or Firm — Lerner, David, Littenberg, Krumholz & Mentlik, LLP

(57) ABSTRACT

To perform matching between a user who provides a first person view and a user who views the first person view. An icon indicating a current position of each Body is displayed on a map of a range that is currently specified. A Ghost can select a Body to whom the Ghost desires to perform JackIn by specifying an icon in a desired position by UI operation such as a touch or click. Further, when a keyword for limiting behavior or the like is input to a search field, only Bodies extracted on the basis of the behavior are displayed. Then, when selection is settled, a JackIn request is transmitted from the Ghost to the selected Body.

15 Claims, 14 Drawing Sheets

(51) Int. Cl.
  H04M 1/00     (2006.01)
  H04N 7/18     (2006.01)
  G06F 16/00    (2019.01)
  H04L 29/06    (2006.01)
  H04L 29/08    (2006.01)

(52) U.S. Cl.
  CPC ...... *H04L 65/1069* (2013.01); *H04L 65/1089* (2013.01); *H04L 67/18* (2013.01); *H04L 67/306* (2013.01); *H04M 1/00* (2013.01); *H04N 7/18* (2013.01)

(56) References Cited

U.S. PATENT DOCUMENTS

| | | |
|---|---|---|
| 2004/0165076 A1 | 8/2004 | Nishimura et al. |
| 2004/0254982 A1 | 12/2004 | Hoffman et al. |
| 2009/0240371 A1 | 9/2009 | Wang et al. |
| 2010/0097463 A1* | 4/2010 | Tsuzuki .................. G06F 21/33 348/143 |
| 2011/0292193 A1 | 12/2011 | Wang et al. |
| 2012/0222101 A1 | 8/2012 | Iwasaki et al. |
| 2013/0027561 A1* | 1/2013 | Lee .................... G06K 9/00302 348/150 |
| 2013/0035790 A1 | 2/2013 | Olivier, III et al. |
| 2013/0249947 A1* | 9/2013 | Reitan .................. G06T 19/006 345/633 |
| 2013/0298150 A1 | 11/2013 | Wakai et al. |
| 2014/0148738 A1 | 5/2014 | Nagasaka et al. |
| 2015/0172757 A1 | 6/2015 | Kafle et al. |
| 2015/0192774 A1* | 7/2015 | Watanabe ............. G06Q 10/087 345/8 |
| 2016/0093108 A1* | 3/2016 | Mao ........................ A63F 13/30 345/633 |
| 2016/0132046 A1* | 5/2016 | Beoughter ............ G06F 16/248 700/17 |
| 2016/0173929 A1* | 6/2016 | Klappert ............ H04N 21/4516 725/25 |
| 2016/0210105 A1 | 7/2016 | Ru et al. |
| 2016/0240009 A1* | 8/2016 | Lyren .................. H04N 13/189 |
| 2019/0034849 A1* | 1/2019 | Romaine .......... G06Q 10/06312 |

FOREIGN PATENT DOCUMENTS

| | | |
|---|---|---|
| CN | 103430569 A | 12/2013 |
| CN | 104657099 A | 5/2015 |
| EP | 0901285 A1 | 3/1999 |
| JP | 2003345909 A | 12/2003 |
| JP | 2004222254 A | 8/2004 |
| JP | 2005222254 A | 8/2005 |
| JP | 2006186645 A | 7/2006 |
| JP | 2008154192 A | 7/2008 |
| JP | 2012-133534 A | 7/2012 |
| JP | 2013078892 A | 5/2013 |
| JP | 2013078893 A | 5/2013 |
| JP | 2013078894 A | 5/2013 |
| JP | 2013191464 A | 9/2013 |
| JP | 2014104185 A | 6/2014 |
| JP | 2014522053 A | 8/2014 |
| WO | 1998/038798 A1 | 9/1998 |
| WO | 9838798 A1 | 9/1998 |
| WO | 2012/127799 A1 | 9/2012 |

OTHER PUBLICATIONS

Supplementary Partial European Search Report for EP16850809 dated Mar. 28, 2019.
Extended European Search Report including the Written Opinion for Application No. EP 16850809.1 dated Jul. 2, 2019, pp. 1-9.
Chinese Office Action with Search Report for Application No. 2016800553416 dated Nov. 27, 2019, 9 pages.
Chinese Office Action including the Search Report for Application No. CN 201680055341.6 dated Apr. 2, 2020, pp. 1-20.

* cited by examiner

FIG. 11
 BEHAVIOR INFORMATION; POSITION; acceptance; permission; USAGE FEE
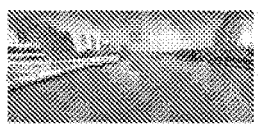 BEHAVIOR INFORMATION; POSITION; acceptance; permission; USAGE FEE
 BEHAVIOR INFORMATION; POSITION; acceptance; permission; USAGE FEE
 BEHAVIOR INFORMATION; POSITION; acceptance; permission; USAGE FEE

FIG. 15
 PERSONAL INFORMATION; RATING; PERFORMANCE; REVIEW/REPUTATION;
 PERSONAL INFORMATION; RATING; PERFORMANCE; REVIEW/REPUTATION;
 PERSONAL INFORMATION; RATING; PERFORMANCE; REVIEW/REPUTATION;
 PERSONAL INFORMATION; RATING; PERFORMANCE; REVIEW/REPUTATION;
 PERSONAL INFORMATION; RATING; PERFORMANCE; REVIEW/REPUTATION;

INFORMATION PROCESSING DEVICE AND INFORMATION PROCESSING METHOD

The present application is a divisional of U.S. patent application Ser. No. 15/760,060, filed Mar. 14, 2018, which is a National Phase entry under 35 U.S.C. § 371 of International Application No. PCT/JP2016/070483 filed Jul. 11, 2016, which claims the priority from Japanese Patent Application No. 2015-195193, filed in the Japanese Patent Office on Sep. 30, 2015, the entire contents of which are incorporated herein by reference.

TECHNICAL FIELD

A technology disclosed in the present specification relates to an information processing device and information processing method for performing matching between users and relates to, for example, an information processing device and information processing method for performing matching between a user who provides a first person view and a user who views the first person view.

BACKGROUND ART

There is known a technology that allows a user to access a sight seen by a person/object other than the user (sight seen by a mobile body other than the user).

For example, there has been proposed a mobile camera system that remotely acquires an image captured by a mobile camera mounted on a mobile body such as a vehicle (e.g., see Patent Literature 1). Further, there has been proposed an image processing system that provides, to a person who wears a head mounted display, information similar to visual information acquired by a person who wears eyeglasses including an imaging sensing wireless device (e.g., see Patent Literature 2). Furthermore, there has been proposed an image display system in which a display device for displaying a captured image of a mobile body specifies, with respect to an imaging device of the mobile body, a point-of-sight position and line-of-sight direction in which an image is captured and a speed at the time of capturing an image (e.g., see Patent Literature 3).

Furthermore, there is also proposed a telepresence technology for transmitting a sensation that a person feels as if the person were on the spot through an interval such as a visual sensation of a robot in a remote location and providing an interface for operating an object in the remote location (e.g., see Patent Literature 4).

CITATION LIST

Patent Literature

Patent Literature 1: JP 2006-186645A
Patent Literature 2: JP 2004-222254A
Patent Literature 3: JP 2008-154192A
Patent Literature 4: JP 2014-522053T
Patent Literature 5: JP 2014-104185A

DISCLOSURE OF INVENTION

Technical Problem

An object of the technology disclosed in the present specification is to provide an excellent information processing device and information processing method capable of performing matching between users.

Solution to Problem

The technology disclosed in the present specification is devised in view of the above-described problem, a first aspect thereof is an information processing device including: a control unit configured to control connection between a first device that transmits an image and a second device that receives the image in accordance with which of the first device and the second device takes initiative.

According to a second aspect of the technology disclosed in the present specification, in a case where the first device takes initiative in establishing connection with the second device, the control unit of the information processing device according to the first aspect is configured to receive a connection request from the second device, notify the first device in a standby state, and cause image transmission from the first device to the second device to start.

According to a third aspect of the technology disclosed in the present specification, in a case where the second device takes initiative in establishing connection with the first device, the control unit of the information processing device according to the first aspect is configured to notify the first device of a connection request from the second device and cause image transmission from the first device to the second device to start.

According to a fourth aspect of the technology disclosed in the present specification, in a case where the plurality of second devices take initiative in establishing connection with the first device, the control unit of the information processing device according to the first aspect is configured to notify the first device of connection requests from the plurality of second devices only in a case where the connection requests satisfy a predetermined start condition and cause image transmission from the first device to the plurality of second devices to start.

According to a fifth aspect of the technology disclosed in the present specification, the control unit of the information processing device according to the first aspect is configured to control a start of image transmission from the first device to the second device and intervention in the first device by the second device.

A sixth aspect of the technology disclosed in the present specification is an information processing method including: a control step of controlling connection between a first device that transmits an image and a second device that receives the image in accordance with which of the first device and the second device takes initiative.

In addition, a seventh aspect of the technology disclosed in the present specification is an information processing device including: a selection unit configured to select a first device on a basis of position information of the first device, the first device transmitting an image to a second device.

According to an eighth aspect of the technology disclosed in the present specification, the selection unit of the information processing device according to the seventh aspect is configured to present a UI that shows a position of the first device on a map.

According to a ninth aspect of the technology disclosed in the present specification, the selection unit of the information processing device according to the seventh aspect is configured to select the first device further in consideration of behavior of a user.

According to a tenth aspect of the technology disclosed in the present specification, the selection unit of the information processing device according to the eighth aspect is configured to present only the first device on the UI, the first device being extracted on a basis of behavior of a user.

According to an eleventh aspect of the technology disclosed in the present specification, the selection unit of the information processing device according to the eighth aspect is configured to present only the first device on the UI, the first device being extracted on a basis of behavior of a user.

According to a twelfth aspect of the technology disclosed in the present specification, the selection unit of the information processing device according to the eighth aspect is configured to present information regarding intervention in the first device on the UI.

In addition, a thirteenth aspect of the technology disclosed in the present specification is an information processing method including: a selection step of selecting a first device on a basis of position information of the first device, the first device transmitting an image to a second device.

In addition, a fourteenth aspect of the technology disclosed in the present specification is an information processing device including: a selection unit configured to select a first device on a basis of behavior of a user of the first device, the first device transmitting an image to a second device.

According to a fifteenth aspect of the technology disclosed in the present specification, the selection unit of the information processing device according to the fourteenth aspect is configured to present a UI that shows information regarding the image transmitted from the first device.

According to a sixteenth aspect of the technology disclosed in the present specification, the selection unit of the information processing device according to the fifteenth aspect is configured to present information regarding the first device or the user of the first device on the UI.

According to a seventeenth aspect of the technology disclosed in the present specification, the selection unit of the information processing device according to the fifteenth aspect is configured to present only the image on the UI, the image being transmitted from the first device extracted on the basis of the behavior of the user.

In addition, an eighteenth aspect of the technology disclosed in the present specification is an information processing method including: a selection step of selecting a first device on a basis of behavior of a user of the first device, the first device transmitting an image to a second device.

In addition, a nineteenth aspect of the technology disclosed in the present specification is an information processing device including: a selection unit configured to select a second device to which a first device transmits an image on a basis of information regarding the second device or a user of the second device.

According to a twentieth aspect of the technology disclosed in the present specification, the selection unit of the information processing device according to the nineteenth aspect is configured to present a UI that shows information regarding the second device or the user of the second device.

Advantageous Effects of Invention

According to the technology disclosed in the present specification, it is possible to provide an excellent information processing device and information processing method capable of performing matching between users.

Note that the advantageous effects described in this specification are merely for the sake of example, and the advantageous effects of the present invention are not limited thereto. Furthermore, in some cases the present invention may also exhibit additional advantageous effects other than the advantageous effects given above.

Further objectives, features, and advantages of the technology disclosed in this specification will be clarified by a more detailed description based on the exemplary embodiments discussed hereinafter and the attached drawings.

BRIEF DESCRIPTION OF DRAWINGS

FIG. 11 illustrates a UI display example for selecting a Body.

FIG. 15 illustrates an example of a UI that allows a Body to select a Ghost.

MODE(S) FOR CARRYING OUT THE INVENTION

Hereinafter, an embodiment of the technology disclosed in the present specification will be described in detail with reference to the drawings.

A. System Configuration

Figure 1:
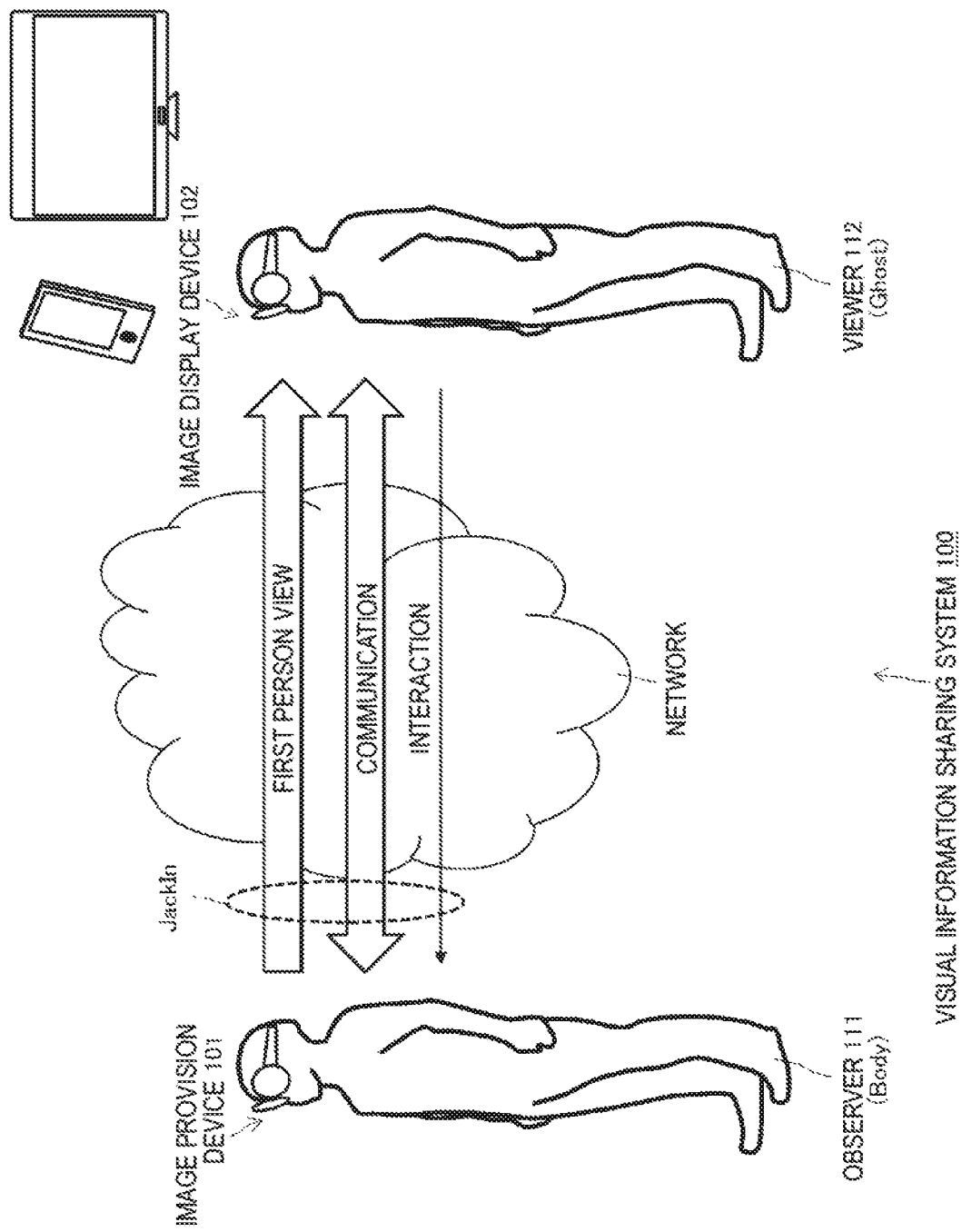
FIG. 1 illustrates an overview of a visual information sharing system 100 to which a technology disclosed in the present specification is applied.

FIG. 1 illustrates an overview of a visual information sharing system 100 to which the technology disclosed in the present specification is applied. The visual information sharing system 100 illustrated in FIG. 1 is configured by combining an image provision device 101 for providing an image obtained by capturing an image of a site and an image display device 102 for displaying the image provided from the image provision device 101.

The image provision device 101 specifically includes a camera-equipped see-through head mounted display mounted on a head part of an observer 111 who actually acts on a site. The "see-through" head mounted display herein is basically optical transmissive but may be a video see-through head mounted display. The camera provided in the head mounted display captures an image of a substantially line-of-sight direction of the observer 111 and provides a first person view (FPV) thereof.

Meanwhile, the image display device 102 is assumed to be arranged separately from the site, i.e., from the image provision device 101, and the image provision device 101 and the image display device 102 are assumed to communicate with each other via a network. The term "separately" herein includes not only a remote location but also a situation in which the image provision device 101 and the image display device 102 are slightly (e.g., approximately several meters) separate in the same room. Further, the image provision device 101 and the image display device 102 are also assumed to exchange data via a server (not illustrated).

The image display device 102 is, for example, a head mounted display worn by a person who is not on the site (viewer of captured image) 112. By using an immersive head mounted display as the image display device 102, the viewer 112 can experience the same sight as that of the observer 111 with more reality. However, a see-through head mounted display may be used as the image display device 102.

Further, the image display device 102 is not limited to a head mounted display and may be, for example, a wristwatch display. Alternatively, the image display device 102 does not need to be a wearable terminal and may be a multifunctional information terminal such as a smartphone or a tablet, a general monitor display such as a computer screen or a television receiver, a game console, a projector for projecting an image on a screen, or the like.

Because the observer 111 is actually on the site and acts with his/her body, the observer 111 who is a user of the image provision device 101 (or the image provision device 101) will also be referred to as "Body" hereinafter. Meanwhile, the viewer 112 does not act with his/her body on the site but is conscious of being on the site by viewing a first person view of the observer 111, and therefore the viewer 112 who is a user of the image display device 102 (or the image display device 102) will also be referred to as "Ghost" hereinafter.

A Body transmits the own peripheral situation to a Ghost and further shares the situation with the Ghost. One of Ghosts communicates with the Body and thus can achieve interactions such as operation support from a separate location. Immersing the Ghost in a first person experience of the Body to allow the Ghost to perform interactions in the visual information sharing system 100 will also be referred to as "JackIn" hereinafter. A start flow of JackIn is roughly classified into a case where the Body takes the initiative in performing JackIn (Body initiative start) and a case where the Ghost takes the initiative in performing JackIn (Ghost initiative start). Details of the JackIn start flow will be described below.

The visual information sharing system 100 basically has a function of transmitting a first person view from the Body to the Ghost to allow the Ghost to view and experience the first person view and a function of allowing the Body and the Ghost to communicate with each other. By using the latter communication function, the Ghost can interact with the Body by intervention from a remote location, such as "visual intervention" that allows the Ghost to intervene in vision of the Body, "auditory intervention" that allows the Ghost to intervene in an auditory sensation of the Body, "body intervention" that allows the Ghost to move or stimulate a body of the Body or a part of the body, and "alternative conversation" that allows the Ghost to speak on a site, instead of the Body. It can also be said that JackIn has a plurality of communication channels such as "visual inter-vention", "auditory intervention", "body intervention", and "alternative conversation". Details of "visual intervention", "auditory intervention", "body intervention", and "alternative conversation" will be described below.

The Ghost can instruct the Body on behavior on a site through "visual intervention", "auditory intervention", "body intervention", or "alternative conversation". For example, the visual information sharing system 100 can be utilized for operation support in various industrial fields such as a medical site of a surgical operation and the like and a construction site of a construction work and the like, instructions on control of airplanes and helicopters and guidance thereof, navigation of drivers of automobiles, coaching or instructions in sports, and other uses.

For example, not only in a case where the Body desires to share the own vision with another person but also in a case where the Body desires (or needs) to be assisted, instructed, guided, and navigated by another person regarding operation that the Body currently performs through the visual intervention or the like, the Body takes the initiative in implementing JackIn with an appropriate Ghost (Body initiative start).

Further, not only in a case where the Ghost desires to view a video on a site (first person view of another person) without visiting the site but also in a case where the Ghost desires (or needs) to assist, instruct, guide, and navigate another person regarding operation that the person currently performs, the Ghost takes the initiative in implementing JackIn with a corresponding Body (Ghost initiative start).

Note that, when the Body is unlimitedly subjected to visual intervention, auditory intervention, body intervention, or conversational intervention, the own behavior may be interrupted by the Ghost, or the own behavior may be hindered and is therefore dangerous, and, in some cases, the Body's privacy is invaded. Meanwhile, the Ghost may also have some videos that the Ghost does not desire to view, or, in some cases, cannot provide services such as appropriate assistance, instruction, guidance, and navigation to the Body even in a case where the Ghost is asked to. Therefore, JackIn to the Body by the Ghost and intervention in the Body by the Ghost in a JackIn state may be limited at a certain level.

Figure 2:
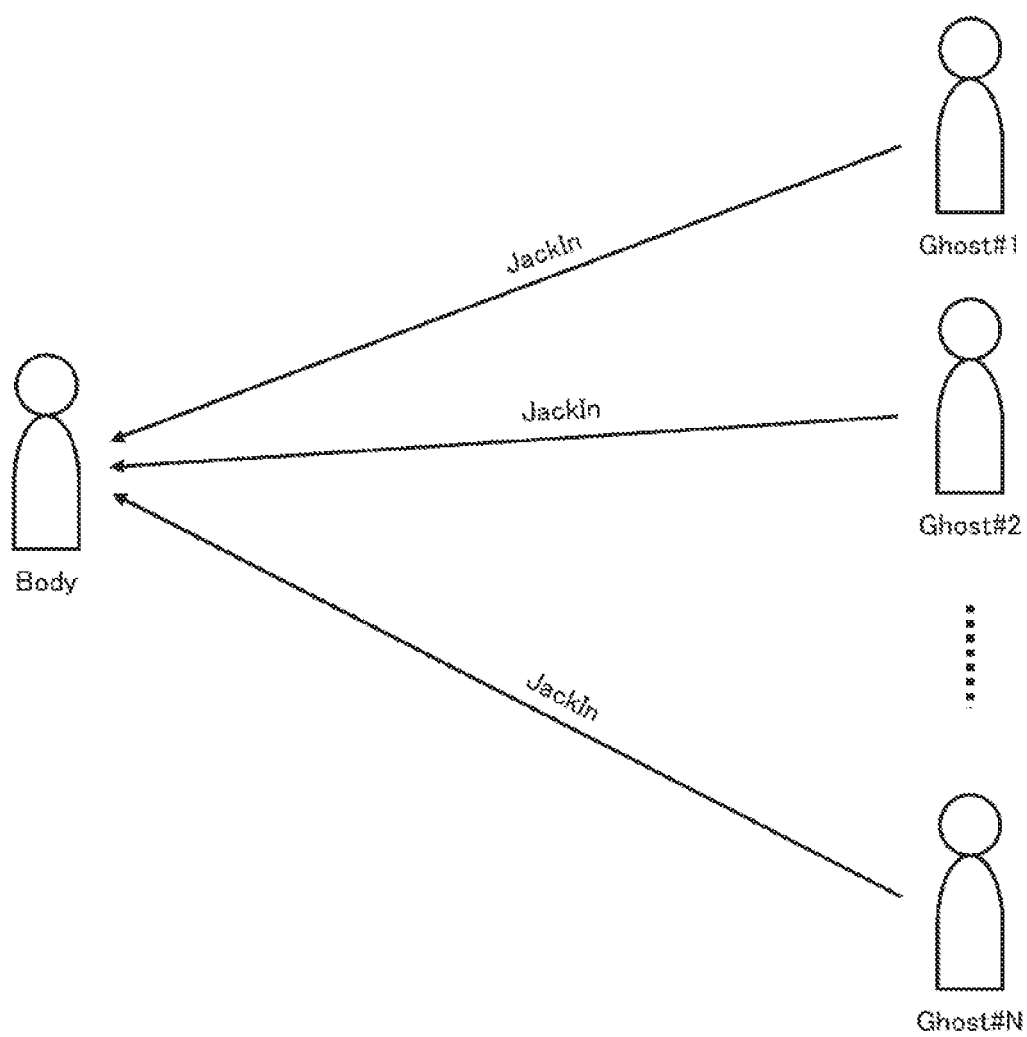
FIG. 2 schematically illustrates a network topology of 1 to N.
Figure 3:
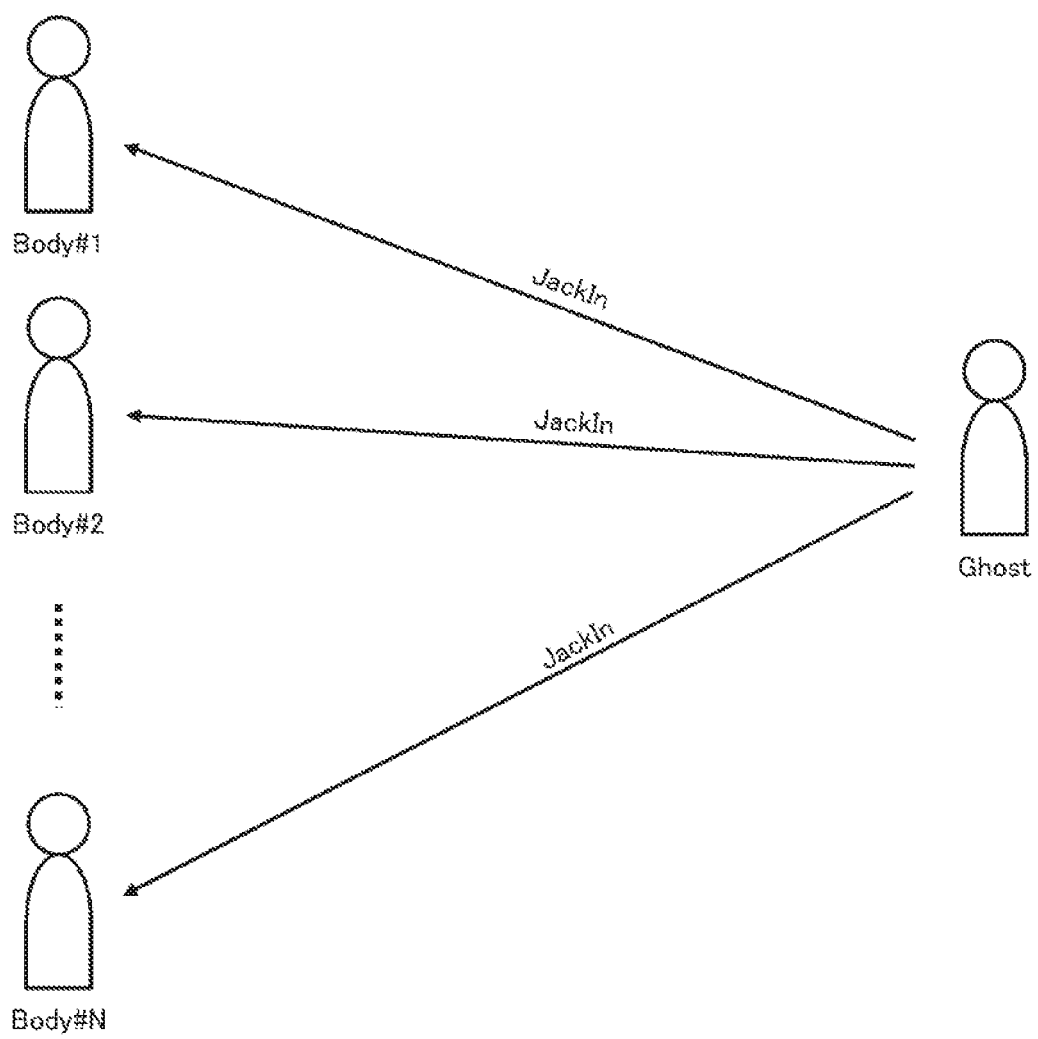
FIG. 3 schematically illustrates a network topology of N to 1.
Figure 4:
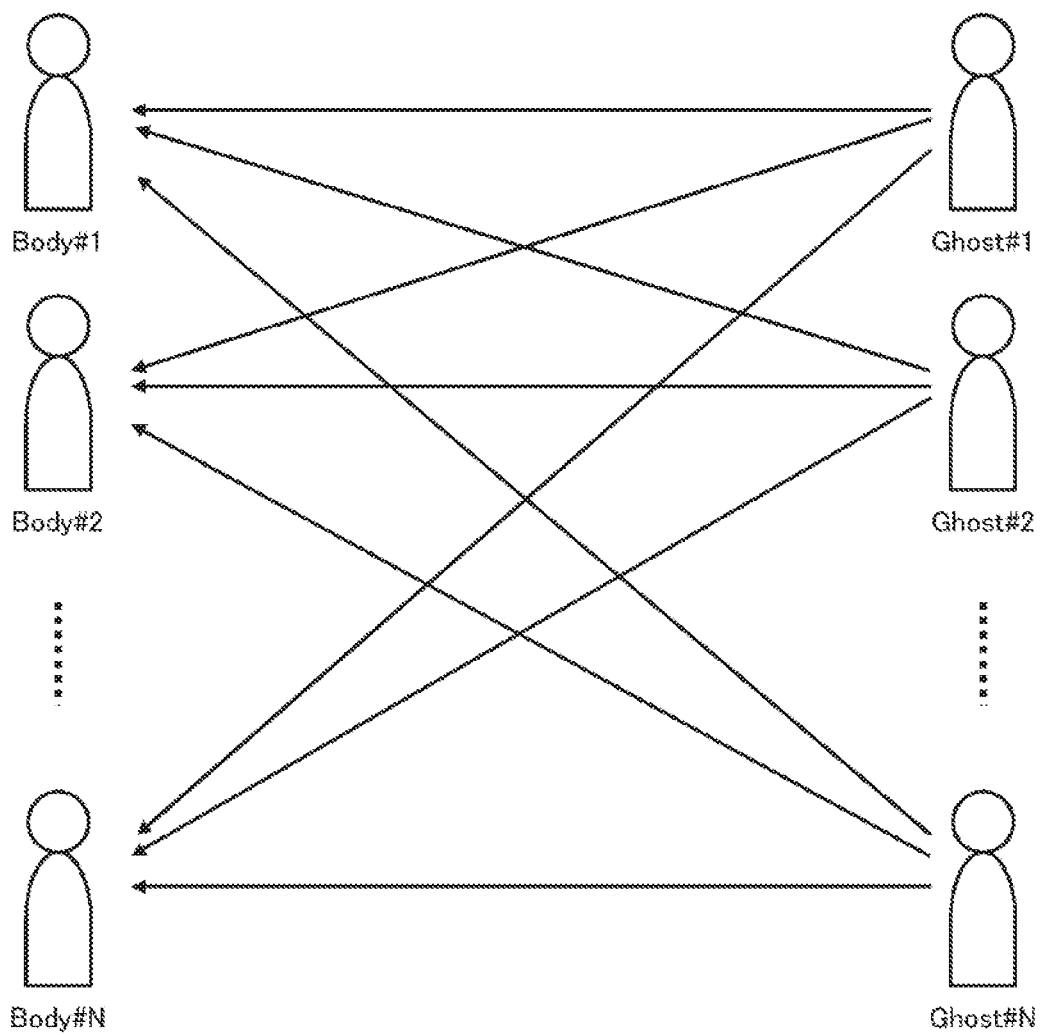
FIG. 4 schematically illustrates a network topology of N to N.

Note that, for simplification, FIG. 1 illustrates a network topology of a single Body to a single Ghost, i.e., in which only a single image provision device 101 and a single image display device 102 exist. The following are also assumed: a network topology of 1 to N in which a single Body and a plurality (N) of Ghosts simultaneously perform JackIn as illustrated in FIG. 2; a network topology of N to 1 in which a plurality (N) of Bodies and a single Ghost simultaneously perform JackIn as illustrated in FIG. 3; and a network topology of N to N in which a plurality (N) of Bodies and a plurality (N) of Ghosts simultaneously perform JackIn as illustrated in FIG. 4.

Further, switching a single device from a Body to a Ghost, switching a single device from a Ghost to a Body, and simultaneously having a role of a Body and a role of a Ghost are also assumed. There is also assumed a network topology (not illustrated) in which a single device performs JackIn to a Body as a Ghost and, at the same time, functions as a Body for another Ghost, i.e., three or more devices are daisy-chain connected. In any network topology, a server (not illustrated) may be interposed between a Body and a Ghost.

B. Functional Configuration

Figure 5:
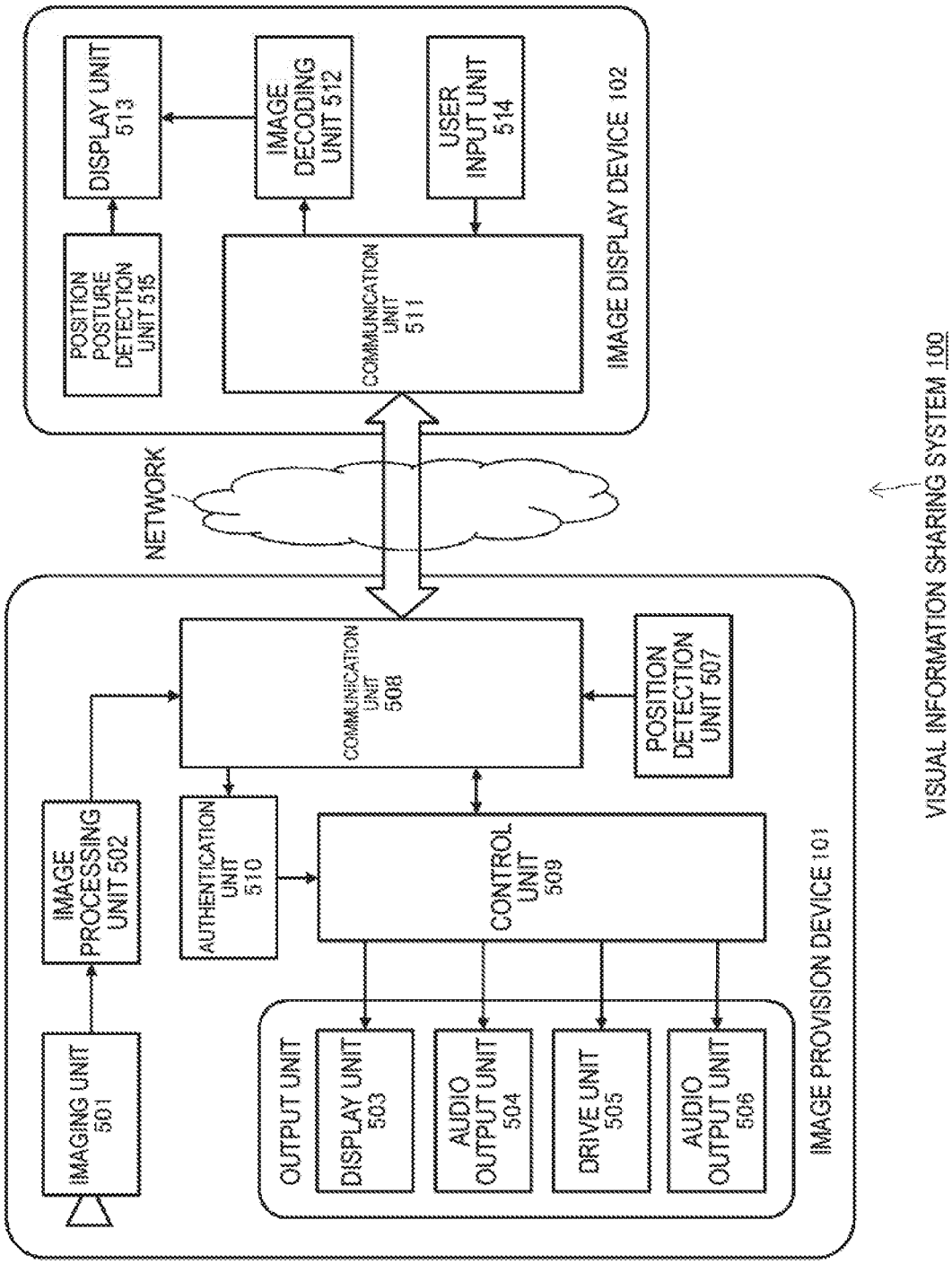
FIG. 5 illustrates a functional configuration example of an image provision device 101 and an image display device 102.

FIG. 5 illustrates a functional configuration example of the image provision device 101 and the image display device 102.

The image provision device 101 is a device to be used by a user (observer 112) who takes a role as a Body. In the example illustrated in FIG. 5, the image provision device 101 includes an imaging unit 501, an image processing unit 502, a display unit 503, a first audio output unit 504, a drive unit 505, and a second audio output unit 506 serving as an output unit, a position detection unit 507, a communication unit 508, a control unit 509, and an authentication unit 510.

The imaging unit 501 includes a camera for capturing an image of a first person view of the Body. The imaging unit 501 is attached to the head part of the observer 111 so as to capture an image of, for example, a line-of-sight direction of the Body, i.e., the observer 111. Alternatively, a whole-sky camera may be used as the imaging unit 501 to provide a 360-degree whole-sky image of an environment around the Body. However, the whole-sky image does not necessarily need to be a 360-degree image, and a field of view may be narrower. Further, the whole-sky image may be a half celestial sphere image that does not include a floor surface containing little information (The same applies hereinafter.).

The image processing unit 502 processes image signals output from the imaging unit 501. In a case where the image of the first person view of the Body captured by the imaging unit 501 is streamed as it is, the Ghost views a video that shakes strongly because the Body looks out over a surrounding environment on his/her own and changes a line-of-sight direction. Thus, health hazards such as virtual reality (VR) sickness and motion sickness are a matter of concern. Further, the Ghost may desire to view a part on which the Body does not focus. In view of this, the image processing unit 502 simulatively forms a surrounding space on the basis of continuous images of the first person view of the Body captured by the imaging unit 501. Specifically, the image processing unit 502 performs space recognition based on simultaneous localization and mapping (SLAM) recognition technology or the like in real time with respect to a video (whole-sky image) captured by the imaging unit 501 and spatially joins a current video frame and a past video frame together, thereby rendering a video seen from a viewpoint of a virtual camera controlled by the Ghost. The video rendered at the viewpoint of the virtual camera is a video seen from a viewpoint that is simulatively out of a body of the Body rather than the first person view of the Body. Therefore, the Ghost can observe an environment around the Body independently from motion of the Body. This makes it possible to stabilize shaking of the video to prevent VR sickness and view a part on which the Body does not focus.

The display unit 503 displays and outputs information transmitted from the image display device 102, thereby allowing the Ghost to intervene in vision of the Body. In a case where the image provision device 101 is a see-through head mounted display as described above, the display unit 503 superimposes and displays an augmented reality (AR) image that expresses consciousness of the Ghost who shares a first person experience with the Body on vision of the observer 111 (i.e., scene of a real world). The AR image includes images such as a pointer, an annotation, or the like showing a location indicated by the Ghost. Therefore, the Ghost can communicate with the Body to intervene in the vision thereof, thereby interacting with the Body on a site.

The first audio output unit 504 includes, for example, earphones, headphones, or the like and causes the Body to listen to information transmitted from the image display device 102, thereby allowing the Ghost to intervene in an auditory sensation of the Body. The image display device 102 transmits information regarding consciousness of the Ghost who shares a first person experience with the Body.

The image provision device 101 converts received information into audio signals and outputs audio from the first audio output unit 504, thereby causing the Body, i.e., the observer 111 to listen to the audio. Alternatively, audio signals uttered by the Ghost who currently has a first person experience are transmitted from the image display device 102 as they are. The image provision device 101 outputs the received audio signals in the form of audio from the first audio output unit 504 as they are, thereby causing the Body, i.e., the observer 111 to listen to the audio. Further, volume, quality, an output timing, and the like of audio output from the first audio output unit 504 may be appropriately adjusted. Alternatively, image information or character information transmitted from the image display device 102 may be converted into audio signals and be output in the form of audio from the first audio output unit 504. Therefore, the Ghost can communicate with the Body to intervene in the auditory sensation thereof, thereby interacting with the Body on a site.

The drive unit 505 moves or stimulates the body of the Body or a part of the body, thereby allowing the Ghost to intervene in the body of the Body. The drive unit 505 includes, for example, an actuator for applying tactile sensations or electrical stimulation (which is slight and thus does not harm health) to the body of the observer 111. Alternatively, the drive unit 505 includes a device (e.g., see Patent Literature 5) for supporting or restricting motion of the body by driving a powered suit or exoskeleton worn on arms, hands, legs, or the like of the observer 111. Therefore, the Ghost can communicate with the Body to intervene in the body thereof, thereby interacting with the Body on a site.

The second audio output unit 506 includes, for example, a wearable speaker or the like worn by the Body and outputs information or audio signals transmitted from the image display device 102 to the outside in the form of audio. The audio output from the second audio output unit 506 is heard on a site as if the Body himself/herself spoke. Therefore, the Ghost can have a conversation with people on a site where the Body exists or can give an instruction with audio, instead of the Body (alternative conversation).

The position detection unit 507 detects current position information of the image provision device 101 (i.e., Body) by using, for example, global positioning system (GPS) signals. The detected position information is used in a case where, for example, the Ghost searches for a Body who exists in a location desired by the Ghost (described later).

The communication unit 508, which is mutually connected to the image display device 102 via a network, transmits an image of a first person view captured by the imaging unit 501 and space information and communicates with the image display device 102. Communication means of the communication unit 508 may be wireless or wired communication means and is not limited to a particular communication standard.

The authentication unit 510 performs authentication processing of the image display device 102 (or the Ghost who is a user thereof) which is mutually connected via a network and determines an output unit for outputting information transmitted from the image display device 102. Then, the control unit 509 controls output operation from the output unit on the basis of a result of authentication by the authentication unit 510. The control unit 509 has, for example, functions corresponding to a central processing unit (CPU) and a graphic processing unit (GPU).

For example, in a case where the image display device 102 is permitted to perform only visual intervention as a result of the authentication processing, the control unit 509 executes only display output from the display unit 503.

Further, in a case where the image display device 102 is permitted to perform not only visual intervention but also auditory intervention, the control unit 509 executes both display output from the display unit 503 and audio output from the first audio output unit 504. A range in which the Body permits intervention by the Ghost is defined as a permission level. Meanwhile, a range in which the Ghost intervenes in the Body is defined as a mission level (described below). Note that it is also possible to form the visual information sharing system 100 so that the above processing performed by the authentication unit 510 and the control unit 509 is executed by the server (not illustrated) interposed between the image provision device 101 and the image display device 102, instead of the image provision device 101.

Meanwhile, the image display device 102 is a device to be used by a user (viewer 112) who takes a role as a Ghost. In the example illustrated in FIG. 5, the image display device 102 includes a communication unit 511, an image decoding unit 512, a display unit 513, a user input unit 514, and a position posture detection unit 515.

The communication unit 511, which is mutually connected to the image provision device 101 via a network, receives a first person view from the image provision device 101 and communicates with the image provision device 101. Communication means of the communication unit 511 may be wireless or wired communication means and is not limited to a particular communication standard. However, the communication means is compatible with the communication unit 508 of the image provision device 101.

The image decoding unit 512 performs decoding processing of image signals that the communication unit 511 receives from the image provision device 101. The display unit 513 displays and outputs the whole-sky image (first person view of the Body) which has been decoded in the image decoding unit 512. Note that the processing for rendering a video seen from a viewpoint out of the body of the Body (described above) from the first person view of the Body may be performed by the image decoding unit 512, instead of the image processing unit 502 of the image provision device 101.

The position posture detection unit 515 detects a position and posture f a head part of the viewer 112. The detected position and posture correspond to a current viewpoint position and line-of-sight direction of the Ghost. A viewpoint position and line-of-sight direction of the virtual camera (described above) to create a video seen from a viewpoint simulatively out of the body of the Body on the basis of the first person view of the Body can be controlled on the basis of the position and posture of the head part of the viewer 112 detected by the position posture detection unit 515.

The display unit 513 includes, for example, a head mounted display worn by the viewer 112 serving as a Ghost. By using an immersive head mounted display as the display unit 513, the viewer 112 can experience the same sight as that of the observer 111 with more reality. A video viewed by the viewer 112, i.e., the Ghost is not the first person view of the Body itself but is a surrounding space simulatively formed on the basis of continuous images of the first person view (video seen from a viewpoint simulatively out of the body of the Body) (described above). Further, it is possible to perform control so that the virtual camera performs head tracking of the Ghost, i.e., follows the viewpoint position and line-of-sight direction of the viewer 112 detected by the position posture detection unit 515, thereby moving an angle of view of display on the display unit 513.

The display unit 513 may be a wearable terminal such as a see-through head mounted display or a wrist-watch display, instead of an immersive head mounted display. Alternatively, the display unit 513 does not need to be a wearable terminal and may be a multifunctional information terminal such as a smartphone or a tablet, a general monitor display such as a computer screen or a television receiver, a game console, a projector for projecting an image on a screen, or the like.

The user input unit 514 is a device for allowing the viewer 112 serving as a Ghost to input the Ghost's own intention or consciousness in response to observation of the first person view of the Body displayed on the display unit 513.

The user input unit 514 includes, for example, a coordinate input device such as a touchscreen, a mouse, or a joystick. By touching, click operation of the mouse, or the like, the Ghost can directly indicate a location in which the Ghost is particularly interested on a screen that displays the first person view of the Body. The Ghost gives an indication on a pixel coordinate of a video that the Ghost currently views. However, a captured video of the Body always changes, and therefore an indication on the pixel coordinate is meaningless. In view of this, the user input unit 514 specifies, by image analysis or the like, position information on a three-dimensional space corresponding to a pixel position that the Ghost indicates by touching, click operation, or the like on the screen and transmits the position information in the three-dimensional space to the image provision device 101. Therefore, the Ghost can perform pointing that achieves fixation in a space, instead of on the pixel coordinate.

Further, the user input unit 514 may capture eye movement by using an image of a face of the Ghost captured by a camera or an eye potential, calculate a location at which the Ghost gazes, and transmit information specifying the location to the image provision device 101. Also at that time, the user input unit 514 specifies, by image analysis or the like, position information in the three-dimensional space corresponding to a pixel position at which the Ghost gazes, and transmits the position information in the three-dimensional space to the image provision device 101. Therefore, the Ghost can perform pointing that achieves fixation in a space, instead of on the pixel coordinate.

Further, the user input unit 514 includes a character input device such as a keyboard. When the Ghost has the same first person experience as that of the Body, the Ghost can input an intention that the Ghost desires to inform the Body, a consciousness that the Ghost has, and the like as character information. The user input unit 514 may transmit the character information input by the Ghost as it is to the image provision device 101 or may convert the character information into other forms of signals such as audio signals and then transmit the signals to the image provision device 101.

Further, the user input unit 514 includes an audio input device such as a microphone and inputs audio uttered by the Ghost. The user input unit 514 may transmit the input audio as they are in the form of audio signals from the communication unit 511 to the image provision device 101. Alternatively, the user input unit 514 may perform audio recognition of the input audio, convert the input audio into character information, and transmit the character information to the image provision device 101.

The Ghost is assumed to indicate an object by using a demonstrative pronoun such as "that" or "this" while viewing the first person view of the Body. In such a case, the user input unit 514 specifies, by language analysis, image analysis, or the like, position information of the object indicated by the demonstrative pronoun in the three-dimensional space and transmits the position information in the three-dimensional space to the image provision device 101. Therefore, the Ghost can perform pointing that achieves fixation in a space, instead of on the pixel coordinate.

Further, the user input unit 514 may be a gesture input device for inputting body gestures and manual gestures of the Ghost. Means for capturing gestures is not particularly limited. For example, the user input unit 514 may include a camera for capturing an image of movement of arms and legs of the Ghost and an image recognition device for processing the captured image. Further, in order to easily perform image recognition, a marker may be attached to the body of the Ghost. The user input unit 514 may transmit an input gesture from a communication unit 411 to the image provision device 101 as, for example, control signals to intervene in the body of the Body. Further, the user input unit 514 may convert the input gesture into image information to intervene in the vision of the Body (coordinate information, AR image to be superimposed and displayed, character information, or the like) or audio signals to intervene in the auditory sensation of the Body and transmit the image information or audio signals from the communication unit 511 to the image provision device 101. Further, the user input unit 514 specifies, by image analysis or the like, position information in the three-dimensional space corresponding to a pixel position indicated by a gesture of the Ghost and transmits the position information in the three-dimensional space to the image provision device 101. Therefore, the Ghost can perform pointing that achieves fixation in a space, instead of on the pixel coordinate.

A service called JackIn developed in the visual information sharing system 100 resembles a general AR technology in view of superimposing and displaying an AR image. However, it is considered that JackIn is different from a normal AR technology performed by a computer in that a human being (Ghost) augments another human being (Body).

Further, JackIn also resembles telepresence (described above). However, normal telepresence and JackIn are different in that normal telepresence is an interface for viewing the world from a viewpoint of a machine such as a robot, whereas, in JackIn, a human being (Ghost) views the world from a viewpoint of another human being (Body). Further, telepresence presupposes that a human being is a master and a machine is a slave and the machine that is the slave truly reproduces motion of the human being. Meanwhile, in a case where a human being (Ghost) performs JackIn to another human being (Body), the Body does not necessarily move in compliance with the Ghost, i.e., is an independent interface.

In the above visual information sharing system 100, a video provided from the image provision device 101 to the image display device 102 is not limited to a real-time video observed by the Body on a site (i.e., a live video captured by the imaging unit 501) and may be a past recorded video. For example, the image provision device 101 includes a mass storage device (not illustrated) for recording a past video, and the past video may be distributed from the image provision device 101. Alternatively, the past video recorded by the image provision device 101 may be accumulated in a JackIn server (provisional name) for controlling JackIn between the Body and the Ghost or another recording server, and the past video may be streamed from the server to the Ghost (image display device 102). Note that, in a case where the Ghost views the past video, no intervention in the Body including visual intervention and auditory intervention is permitted. This is because the video viewed by the Ghost is not a video of a site where the Body currently operates and intervention based on the past video hinders current operation of the Body.

Note that, regarding details of sharing vision between two devices, see also, for example, Patent Application No. 2013-78893, specification, which has already been transferred to the present applicant. Further, regarding details of visual intervention (display of AR image) in the same system 100, see also, for example, Patent Application No. 2013-78892, specification, Patent Application No. 2013-78894, specification, and Patent Application No. 2013-191464, specification, which have already been transferred to the present applicant.

C. Visual Intervention in Body by Ghost

As described above, JackIn have a plurality of communication channels such as "visual intervention", "auditory intervention", "body intervention", and "alternative conversation". Therefore, by starting JackIn with the Ghost, the Body can share the own vision with the Ghost and can be assisted, instructed, guided, and navigated by the Ghost regarding operation that is currently performed through visual intervention or the like. Further, by starting JackIn with the Body, the Ghost can have a first person experience of the Body without visiting a site and can assist, instruct, guide, and navigate the Body regarding operation thereof through visual intervention or the like.

However, when the Ghost unlimitedly intervenes in the Body's own vision, auditory sensation, or body or performs alternative conversation, the Body's behavior may be interrupted by the Ghost, or the Body's behavior may be hindered and is therefore dangerous, and, in some cases, the Body's privacy is invaded. Meanwhile, the Ghost may also have some videos that the Ghost does not desire to view or, in some cases, cannot provide services such as appropriate assistance, instruction, guidance, and navigation even in a case where the Ghost is asked to by the Body. That is, a mismatch between the Body and the Ghost is problematic.

In view of this, in the present embodiment, in order to achieve an appropriate matching between the Body and the Ghost, "permission" and "mission" are defined. A range in which the Body permits intervention by the Ghost is defined as "permission", and intervention by the Ghost is limited to the range prescribed by the permission. Meanwhile, a range of operation in which the Ghost intervenes in the Body is defined as "mission", and a range in which the Ghost intervenes in the Body is limited to the range prescribed by the mission.

C-1. Permission

First, permission will be described. Bodies can appropriately set permission having respective different levels at which intervention is permitted as exemplified below.

(Level 1) Only exchange of vision (transmission of first person view) is permitted. In this case, the image provision device 101 only transmits an image captured by the imaging unit 501 and operates no output unit.

(Level 2) Only exchange of vision and visual intervention are permitted In this case, the image provision device 101 only transmits an image captured by the imaging unit 501 and performs display output on the display unit 503.

(Level 3) Auditory intervention is further permitted. In this case, the image provision device 101 transmits an image captured by the imaging unit 501, performs display output on the display unit 503, and performs audio output from the first audio output unit 504.

(Level 4) All kinds of intervention including body intervention and alternative conversation are permitted. In this case, the image provision device 101 can further drive the drive unit 505 and outputs audio to the outside from the second audio output unit 506.

Further, each Body may give individual permission to each Ghost, instead of giving uniform permission to all the Ghosts.

For example, the Body may set permission based on a user attribute of the Ghost. The user attribute herein includes not only personal information such as age, sex, a human relationship with the Body (family or kinship relation, friend, boss and subordinate, or the like), a place of birth, an occupation, and a qualification, but also rating information of a skill of assistance target operation and information such as past performance (as an assistant, instructor, or the like) (how many hours the Ghost has experienced the operation so far) and review of the Ghost, and reputation by other Bodies (posting, voting result, or the like).

Further, the Body may individually set permission (permission for Mr./Ms. A, permission for Mr./Ms. B, . . . , and the like), instead of setting permission based on an attribute. In other words, permission may be set for each combination of a Body and a Ghost. The Body may set permission on the basis of a human relationship with the Body or may set permission on the basis of abilities of the Ghost that the Body personally grasps. Further, there is also a method of giving temporary permission to a Ghost by one-to-one negotiation, mediation, or the like between a Body and the Ghost (high-level permission is given to a certain Ghost only in a predetermined period of time, and, when the period of time elapses, the permission is restored to original-level permission). Further, the Body may set a user who is prohibited from performing JackIn to the Body himself/herself.

Simple examples of permission settings based on a human relationship will be cited below.

Example 1

Strangers are permitted only sharing of vision (level-1 permission).

Example 2

Friends are permitted visual intervention and auditory intervention (level-2 or 3 permission).

Example 3

Close friends or authenticated or qualified people are specially permitted body intervention (level-4 permission). Alternatively, alternative conversation is temporarily permitted.

Other examples of the permission settings are cases where the Body charges for (i.e., monetizes) JackIn as a service. Any one of the above level-1 permission to level-4 permission is set for the Ghost in accordance with a usage fee paid by the Ghost, and therefore the Ghost can perform JackIn with the Body.

Example 4

A Ghost who pays 5 dollars is permitted only sharing of vision (level-1 permission).

Example 5

A Ghost who pays 10 dollars is permitted visual intervention and auditory intervention (level-2 or 3 permission).

Example 6

A Ghost who pays 100 dollars is permitted body intervention (level-4 permission). Alternatively, alternative conversation is temporarily permitted.

C-2. Mission

Next, mission will be described. In the present embodiment, a range of operation in which a Ghost intervenes in a Body is defined as "mission", and a range in which the Ghost can intervene in the Body is limited to the range prescribed by the mission. The mission of the Ghost is set on the basis of, for example, a range of a mission to be carried out by the Ghost or abilities thereof. The mission is not arbitrarily determined by each Ghost but is preferably permitted or authenticated by, for example, an authoritative organization or the like. Missions having different levels exemplified below can be defined in accordance with a mission to be carried out by the Ghost, a duty, an occupation, a qualification, rating of an intervention skill, past performance (experience time as a Ghost or the like) (as an assistant, instructor, or the like) and review of the Ghost, reputation by Bodies (posting, voting result, or the like), or the like.

(Level 1) Only exchange of vision (transmission of first person view) is performed. In this case, the image display device 102 only displays an image received from the image provision device 101.

(Level 2) Exchange of vision and visual intervention are performed. In this case, the image display device 102 displays an image received from the image provision device 101 and transmits information regarding an image to be displayed in the image provision device 101 (image to be superimposed and displayed and to be used for visual intervention).

(Level 3) Auditory intervention is further performed. In this case, the image display device 102 further transmits information regarding audio to be output by the image provision device 101 (audio to be listened to by the Body).

(Level 4) All kinds of intervention including body intervention and alternative conversation are performed. In this case, the image display device 102 further transmits information for operating the drive unit 505 and information regarding audio to be output from the second audio output unit 506 to the outside.

In a case where the Body starts JackIn with the Ghost, it is only necessary to perform filtering on the basis of personal information and attribute information of the Ghost and further compare permission specified by the Body with a mission that the Ghost has, thereby determining whether or not JackIn can be performed and a range in which intervention can be performed in a JackIn state. For example, filtering processing is effective when the Body takes the initiative in starting JackIn (Body initiative start) by setting an unspecified large number of Ghosts (Large number Ghost) as a target.

Such filtering processing may be performed on the Body side (i.e., in the image provision device 101) or may be performed in a JackIn server (provisional name) for controlling JackIn between a large number of Bodies and a large number of Ghosts.

By setting permission to the Body and setting a mission to the Ghost, it is easy to automatize processing for selecting a Ghost at the time of starting JackIn and processing for determining a range in which the Ghost performs intervention. For example, in a case where an unspecified large number of Ghosts perform JackIn to the Body, the Body can automatically determine a level at which each Ghost is permitted intervention, which is convenient. As a matter of course, whether or not JackIn can be performed or an intervention level may be determined on the spot on the basis of negotiation, mediation, or the like between the Body and the Ghost, instead of being automatically determined on the basis of information such as permission and mission set in advance.

D. JackIn Start Flow

JackIn is a situation in which a Ghost is immersed in a first person experience of a Body in the visual information sharing system 100, and the Ghost interacts with the Body.

As described above, JackIn is roughly classified into a case where the Body takes the initiative in starting JackIn (Body initiative start) and a case where the Ghost takes the initiative in starting JackIn (Ghost initiative start).

Further, in both Body initiative start and Ghost initiative start, JackIn can be classified into a case where a single or (specified) small number of Ghosts perform JackIn (Single (or small number) Ghost) and a case where a (unspecified) large number of Ghosts perform JackIn (Large number Ghosts).

The case where the Body takes the initiative in starting JackIn is assumed to be a situation in which the Body requests assistance, instruction, guidance, or navigation regarding operation that is currently performed. For example, there are a common situation in which the Body requests a person to teach car repair work and a situation in which the Body requests assistance, instruction, guidance, or navigation regarding operation demanding a comparatively high-level technology or skill in a medical site of surgical operation and the like, a construction site of a construction work and the like, and other sites.

JackIn is basically started when the Ghost enters (performs JackIn to) the Body. Therefore, in a case where the Body desires to take the initiative in starting JackIn, the Body requests a desired Ghost (or a predetermined number of Ghosts) to enter the Body himself/herself and then starts operation in a standby state.

Figure 6:
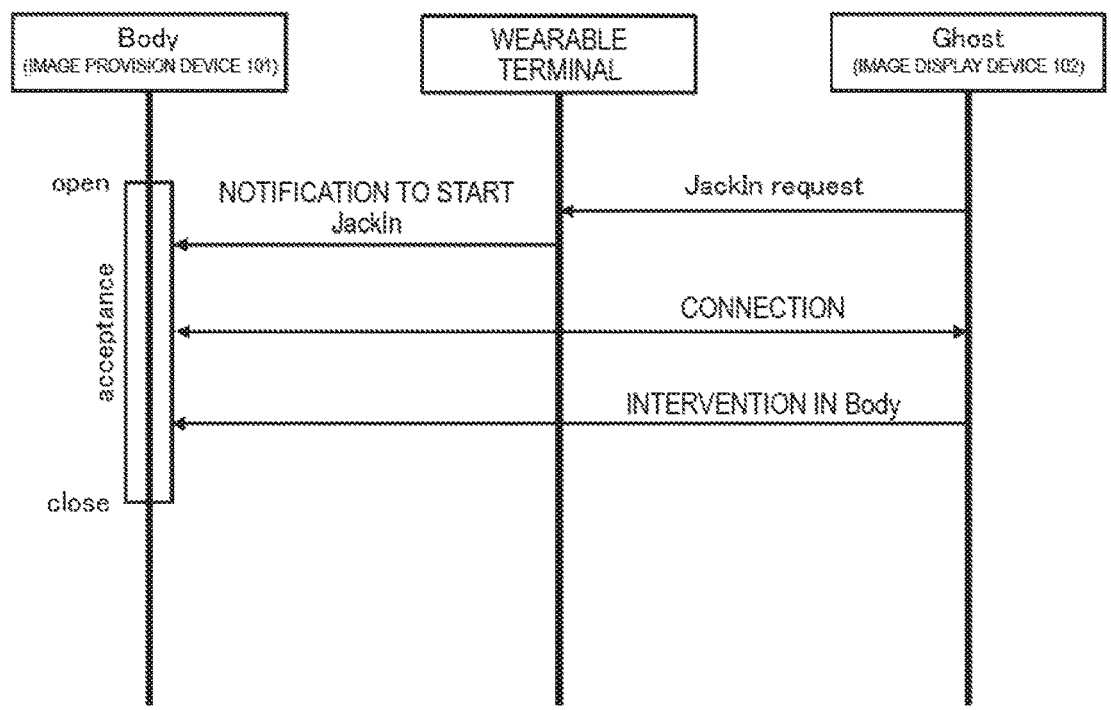
FIG. 6 schematically illustrates a start flow of Body initiative start.

FIG. 6 schematically illustrates a start flow of Body initiative start. FIG. 6 illustrates only a single Ghost for simplification. However, a plurality of Ghosts are assumed to exist.

The Body starts operation in the above standby state while opening "acceptance" for accepting Ghosts.

Note that a form in which the Body requests a Ghost to perform JackIn to the Body is arbitrary. For example, the Body may invite Ghosts by posting comments such as "Need help!", "Please teach me how to drive a vehicle.", and "Please tell me the way to ∘∘." with the use of a social networking service (SNS). Further, the Ghost may charge for (monetize) a service to perform JackIn to assist, instruct, guide, or navigate the Body regarding the operation thereof. The Body may also present a payable price at the time of inviting Ghosts on an SNS or the like. A Ghost who answers the invitation transmits a JackIn request.

When an external device (such as a wearable terminal worn by the user of the image provision device 101) receives the JackIn request from the Ghost (image display device 102) instead of the Body (image provision device 101), the external device notifies the Body.

When the Body receives the notification from the wearable terminal while opening acceptance, the Body establishes connection with the Ghost.

When the Body achieves JackIn with a desired Ghost or the number of connected Ghosts reaches a predetermined number, the Body closes acceptance and thus does not accept notifications from wearable terminals any more. Thereafter, the Body shares vision with the Ghost who has performed JackIn to the Body and performs the operation while being subjected to visual intervention or another intervention by the Ghost.

Note that, in a case where the Body is connected to the Ghost, whether or not connection can be established is automatically determined on the basis of criteria for selection such as past performance and review of the Ghost or is directly determined by the user. Further, in a case where a plurality of Ghosts have performed JackIn to the Body himself/herself, it is also assumed that permission or mission to be set is different for each Ghost.

Further, also in a case where the Body takes the initiative in performing JackIn with a (unspecified) large number of Ghosts, JackIn is basically started in accordance with a sequence similar to the sequence in FIG. 6. The case where the Body takes the initiative in performing JackIn with a (unspecified) large number of Ghosts is assumed to be a situation in which the Body requests unspecified people to give pieces of advice or perform slight operation such as operation that an assistant can do.

The Body invites Ghosts who perform JackIn to the Body himself/herself on an SNS or the like and starts operation in a standby state. Every time when the wearable terminal receives a JackIn request from a Ghost, the wearable terminal notifies the Body. In a case where the Body is connected to a Ghost, whether or not connection can be established is automatically determined on the basis of criteria for selection such as past performance and review of the Ghost or is directly determined by the user. Further, in a case where a plurality of Ghosts have performed JackIn to the Body himself/herself, it is also assumed that permission or mission to be set is different for each Ghost.

Meanwhile, a procedure in which a single Ghost (or a specified small number of Ghosts) takes the initiative in starting JackIn is basically achieved by the Ghost entering (performing JackIn to) the Body. This action resembles operation in which the Ghost makes a phone call to the Body.

Figure 7:
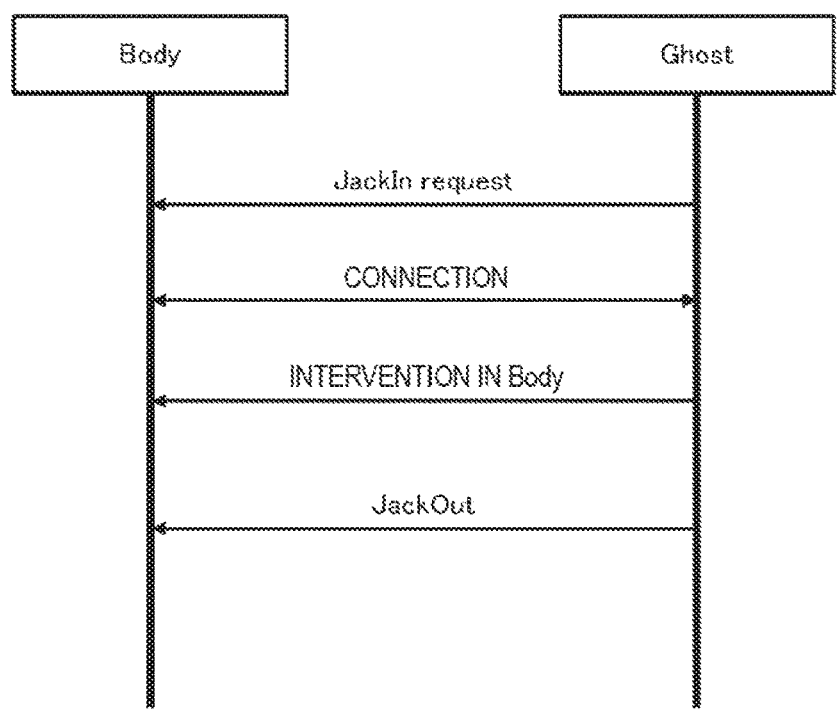
FIG. 7 schematically illustrates a start flow of Ghost initiative start.

FIG. 7 schematically illustrates a start flow of Ghost initiative start. A JackIn request is transmitted from the Ghost to the Body, and therefore a JackIn state is achieved. A first person view is transmitted from the Body to the Ghost, and the Ghost intervenes in the Body.

Note that, in a case where the Body is connected to the Ghost, whether or not connection can be established is automatically determined on the basis of criteria for selection such as past performance and review of the Ghost or is directly determined by the user. Further, at that time, the Body may set permission to the Ghost who has performed JackIn to the Body himself/herself, and the Ghost may set the own mission. The image provision device 101 and the image display device 102 may present a user interface (UI) for setting permission and a UI for setting a mission to the users, respectively.

Further, in a case where a (unspecified) large number of Ghosts take the initiative in performing JackIn with the Body, the Body can set a start condition of JackIn in advance. In this case, the wearable terminal is set to notify the Body only when the start condition is satisfied, instead of notifying the Body every time when a JackIn request is received from a Ghost.

For example, the number of Ghosts who answer invitation can be set as the start condition. In this case, when the number of Ghosts from whom JackIn requests have been received is a predetermined number or larger, the wearable terminal notifies the Body. Only when the number of Ghosts is one hundred or larger, a first person view is distributed from the Body existing on a site. A specific example is a use case where video distribution is started when a Body who participates in a festival writes a message such as "I'm attending the festival now" and the number of Ghosts who desires to view the festival is larger than one hundred.

An overview of a start flow of JackIn in each case is summarized in the following Table 1.

TABLE 1

|  | Single (or small number) Ghost | Large number Ghost |
| --- | --- | --- |
| Body initiative start | A Body opens acceptance of JackIn and starts operation. When a Ghost receives a JackIn REQ and starts JackIn, the Body is notified, and then sharing of vision and operation for intervention are started. | In a case where a Body requests advice from unspecified Ghosts, the Body opens acceptance of JackIn and starts operation. When a Ghost enters the Body, the Body is notified. |
| Ghost initiative start | A Ghost transmits a JackIn REQ to a specified Body, and, when the Body responds thereto, JackIn is started. | A Body sets a start condition. When the start condition is satisfied, a JackIn REQ is transmitted to the Body. |

E. Selection of Body by Ghost

A Ghost can select or filter a Body to whom the Ghost desires to perform JackIn on the basis of a current position of the Body or behavior (operation) that the Body currently performs. Processing for selecting a Body may be implemented by each Ghost, or the JackIn server (provisional name) for controlling JackIn between Bodies and Ghosts may be interposed for the selection processing.

As a presupposition of the selection processing based on a position or behavior, it is necessary to provide a mechanism for notifying the Ghost or the JackIn server of a position and behavior of each Body. For example, the Body side, i.e., the image provision device 101 measures a current position on the basis of a GPS or the like or recognizes behavior that the user currently performs on the basis behavior (activity) recognition, thereby notifying the Ghost or JackIn server of the position and behavior. However, behavior recognition of the Body may not be automatized and may be a method based on character input (writing) or audio input by the Body himself/herself. Hereinafter, description will be provided without limiting a mechanism for specifying a position and behavior of each Body.

Figure 8:
FIG. 8 illustrates a UI display example for selecting a Body.

FIG. 8 illustrates an example of a UI that allows the Ghost to select a Body on the basis of position information of Bodies. In FIG. 8, an icon (or character) indicating a current position of each Body is displayed on a map of a range that is currently specified. Such a UI is displayed on, for example, the display unit 514 of the image display device 102, and the user, i.e., the Ghost can select a Body to whom the Ghost desires to perform JackIn by specifying an icon in a desired position by UI operation such as a touch or click. An area displayed as a map can be caused to transition by operation such as dragging or moving a cursor. Further, the UI screen illustrated in FIG. 8 may be displayed on a screen of another terminal possessed by the Ghost, instead of the display unit 514 of a main body of the image display device 102. Then, when selection is settled, a JackIn request is transmitted from the Ghost to the selected Body.

Figure 9:
FIG. 9 illustrates a UI display example for selecting a Body.

FIG. 9 illustrates an example of a UI that allows the Ghost to select a Body on the basis of not only position information of Bodies but also behavior thereof. FIG. 9 is a display example where "person who is watching fireworks" is input to a search field and a target to be subjected to JackIn is limited to a "person who is watching fireworks". For example, the JackIn server (provisional name) for controlling JackIn between Bodies and Ghosts searches for a Body matching with a keyword (herein, behavior of Body) input to the search field from among a Body group displayed on the map. Then, only Bodies extracted on the basis of behavior of "watching fireworks" are displayed on the UI screen illustrated in FIG. 9. Input to the search field can be performed via character input or audio input. Among the icons displayed in FIG. 8, Bodies who are not watching fireworks disappear, and therefore the Ghost can reduce Bodies to be selected.

Figure 10:
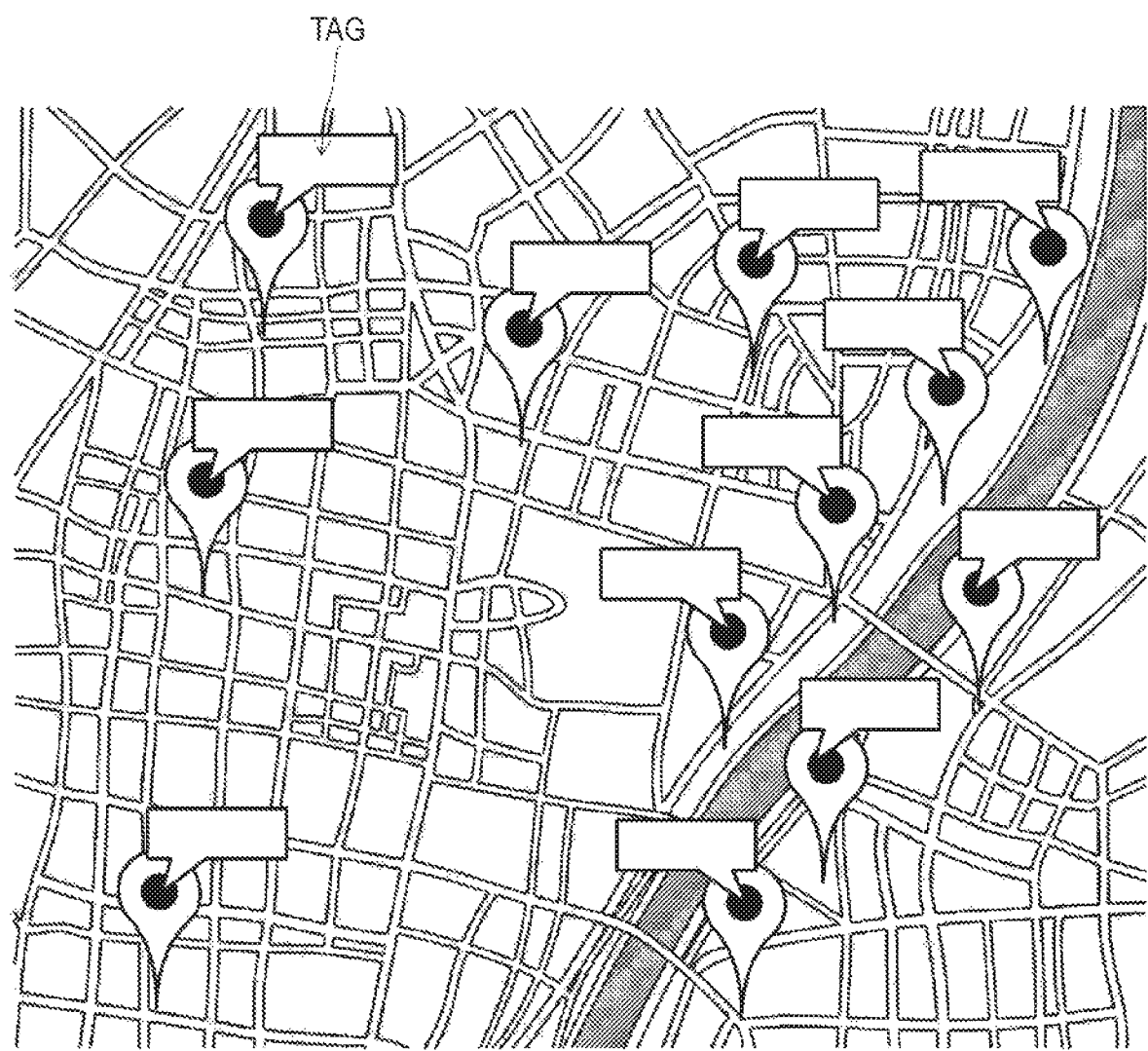
FIG. 10 illustrates a UI display example for selecting a Body.

FIG. 10 illustrates another example of a UI that allows the Ghost to select a Body on the basis of position information of Bodies. FIG. 10 is a modification example of the UI illustrated in FIG. 8, and a tag indicating behavior or the like of each Body is added to the icon of the Body. The Ghost can recognize behavior that each Body currently performs or the like on the basis of content of display of the tag and select a Body to whom the Ghost desires to perform JackIn without performing operation to conduct a search by a search word as in the case illustrated in FIG. 9.

Note that, when tags are constantly displayed on all the icons in the UI display example illustrated in FIG. 10, display becomes complicated, and therefore the map cannot be easily read. Thus, the number of tags that are simultaneously displayed may be restricted by, for example, displaying only a tag of an icon that is provisionally selected by a touch, click, hovering, or the like. Further, the tag may indicate not only information regarding behavior of the Body but also information regarding whether or not acceptance is opened (described above) and permission (a range in which intervention is permitted), charge information (sharing of vision is free or charged; charge information in a case where sharing of vision is charged), and the like.

Figure 13:
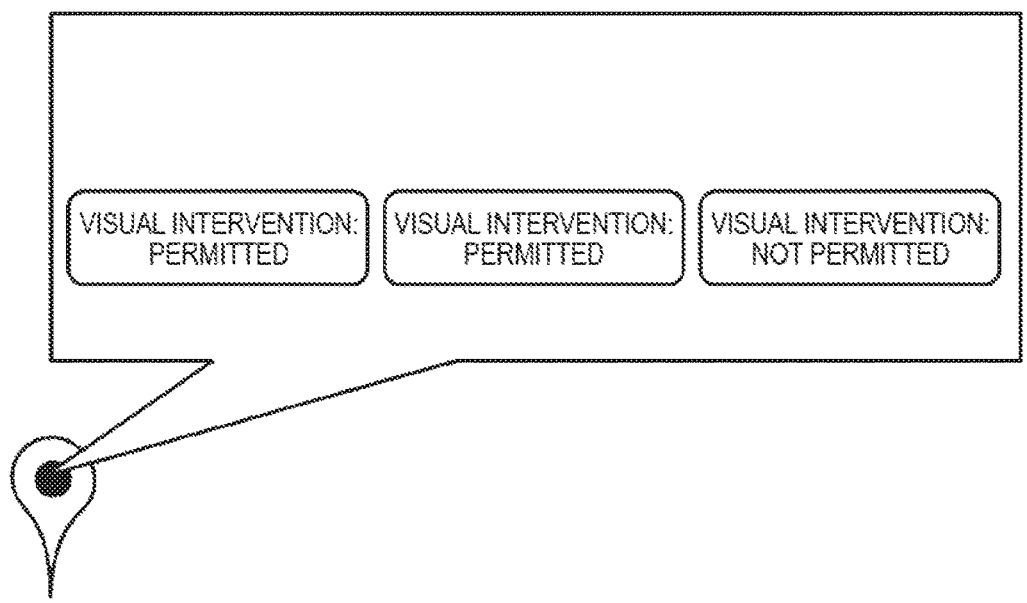
FIG. 13 exemplifies a tag displayed on a Body selection UI.

FIG. 13 illustrates a display example of a tag added to the icon of the Body. The example illustrated in FIG. 13 shows whether or not the Body permits each intervention operation such as visual intervention, auditory intervention, body intervention, and alternative conversation. By referring to such a tag, the Ghost can easily determine what the Ghost can do at that location when the Ghost performs JackIn to the Body.

By using the Body selection UIs illustrated in FIGS. 8 to 10, the Ghost can find a position of a Body on map display and perform JackIn thereto (i.e., perform JackIn to the Body associated with the location), i.e., can achieve operation that the Ghost visually understands with ease. Further, by using the UI illustrated in FIG. 9, the Ghost can smoothly perform JackIn to a Body who performs specified behavior.

FIG. 11 illustrates further another example of a UI that allows the Ghost to select a Body. FIG. 11 displays thumbnails of first person views of respective Bodies in detail in the form of a list, instead of displaying an icon indicating a current position of each Body on a map. The thumbnail of each first person view may be a real-time video or representative image (still image). Further, the thumbnail of each first person view may be displayed together with tag information such as behavior of the Body, a current position of the Body, an acceptance state, a permission setting, and charge information.

Figure 12:
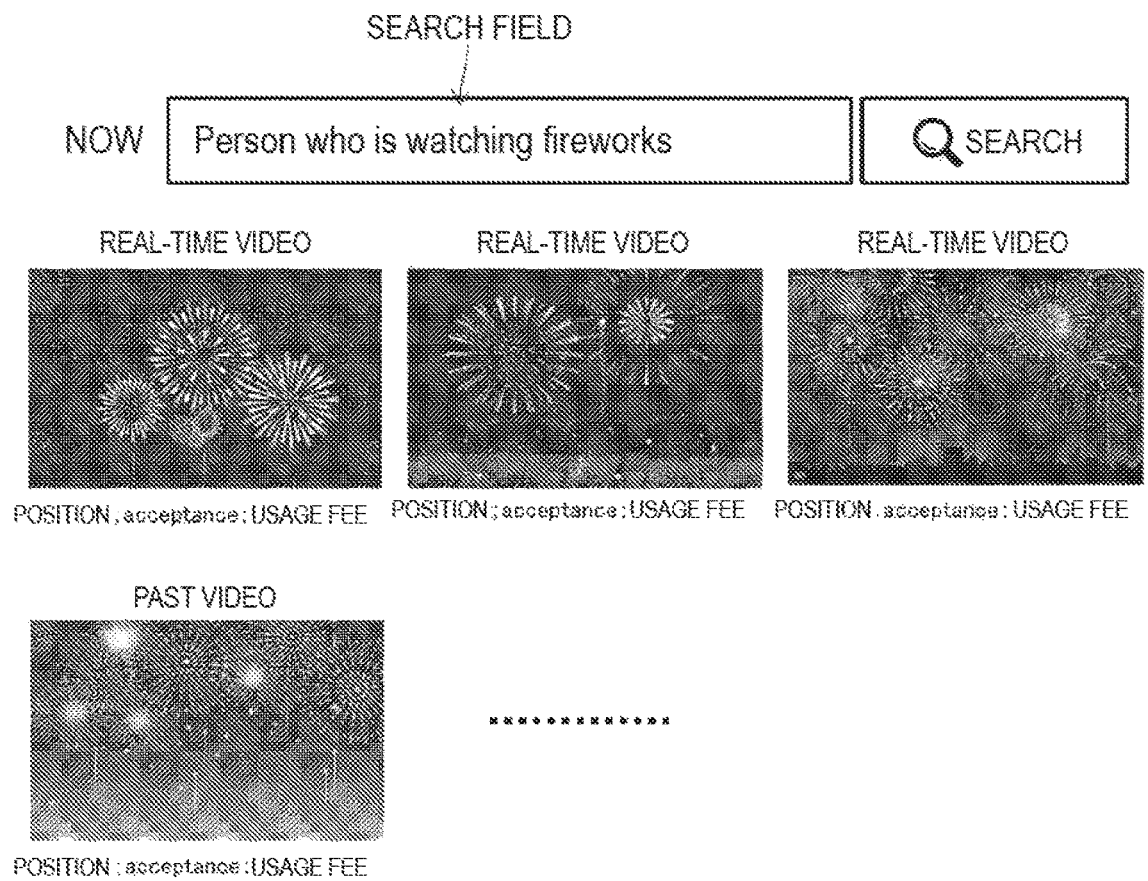
FIG. 12 illustrates a UI display example for selecting a Body.

FIG. 12 illustrates still further another example of a UI that allows the Ghost to select a Body. FIG. 12 is a modification example of the UI illustrated in FIG. 11 and displays thumbnails of first person views of respective Bodies in the form of a catalog instead of the form of a list. In FIG. 12, as well as in the example illustrated in FIG. 11, the thumbnail of each first person view may be displayed together with tag information such as behavior of the Body, a current position of the Body, an acceptance state, a permission setting, and charge information.

Herein, FIG. 12, as well as FIG. 9, is a display example where Bodies serving as a target to be subjected to JackIn are limited to "people who are watching fireworks". For example, the JackIn server (provisional name) for controlling JackIn between Bodies and Ghosts searches for a Body matching with a keyword (herein, behavior of Body) input to a search field. However, the JackIn server searches for Bodies without association with a location, which is different from the example illustrated in FIG. 9. Therefore, Bodies existing in separate locations such as Hokkaido and Okinawa are simultaneously displayed as search results in some cases as long as the Bodies are "watching fireworks".

Note that, as described above, a video provided from a Body is not limited to a real-time video observed by the Body on a site and is a recorded past video in some cases. In a case where the Ghost views a past video, the Ghost is not permitted any intervention in the Body including visual intervention and auditory intervention. Therefore, in the UI example or the like illustrated in FIG. 11 or FIG. 12, in order to prevent intervention caused by misunderstanding by the Ghost, it is preferable that which one of the real-time and recorded past videos is displayed be indicated together with the thumbnail of the first person view.

By using the Body selection UIs illustrated in FIGS. 11 and 12, the Ghost can perform JackIn while visually recognizing behavior performed by each Body on the basis of a displayed thumbnail of a first person view. Further, by using the UI illustrated in FIG. 12, the Ghost can smoothly perform JackIn to a Body who performs specified behavior.

In Conclusion, by using the map-based Body selection UIs illustrated in FIGS. 8 to 10, the Ghost can efficiently select a Body in association with a location. Meanwhile, by using the Body selection UIs that display thumbnails of first person views in the form of a list or catalog illustrated in FIGS. 11 and 12, the Ghost can efficiently select a Body while visually recognizing behavior (activity).

Figure 14A:
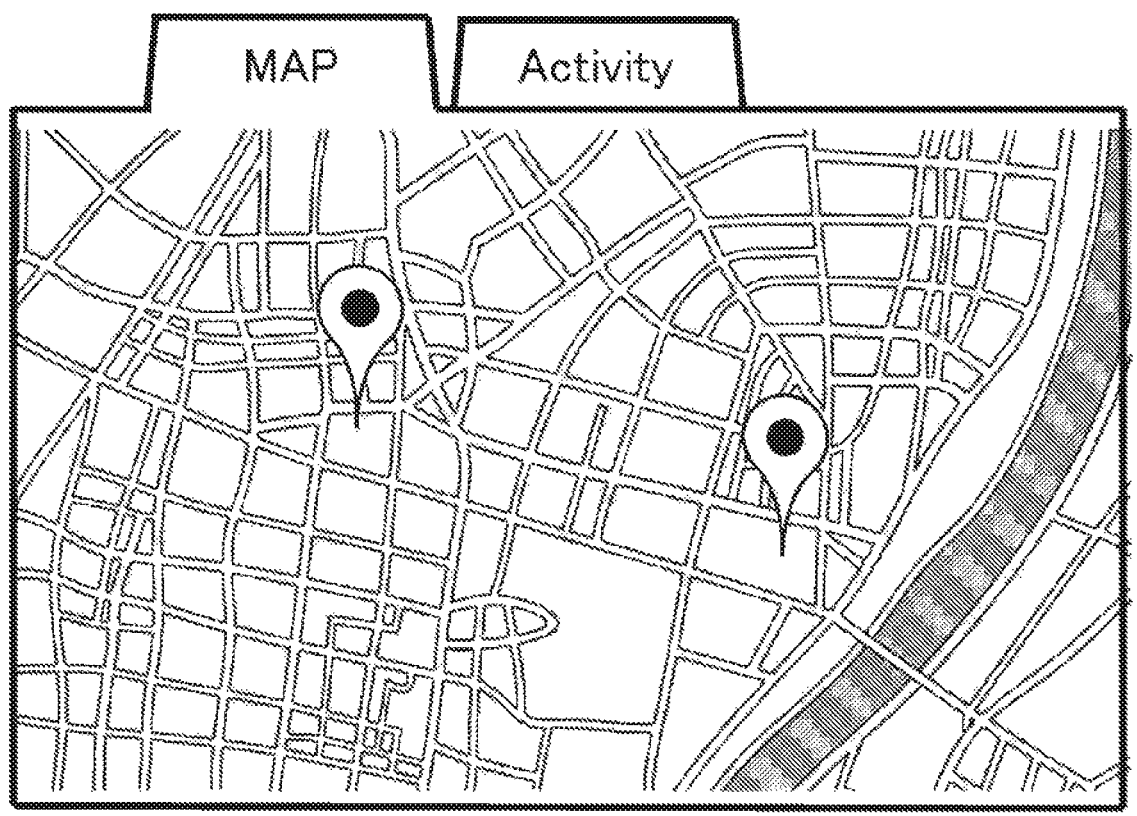
FIG. 14A illustrates a UI display example for selecting a Body.
Figure 14B:
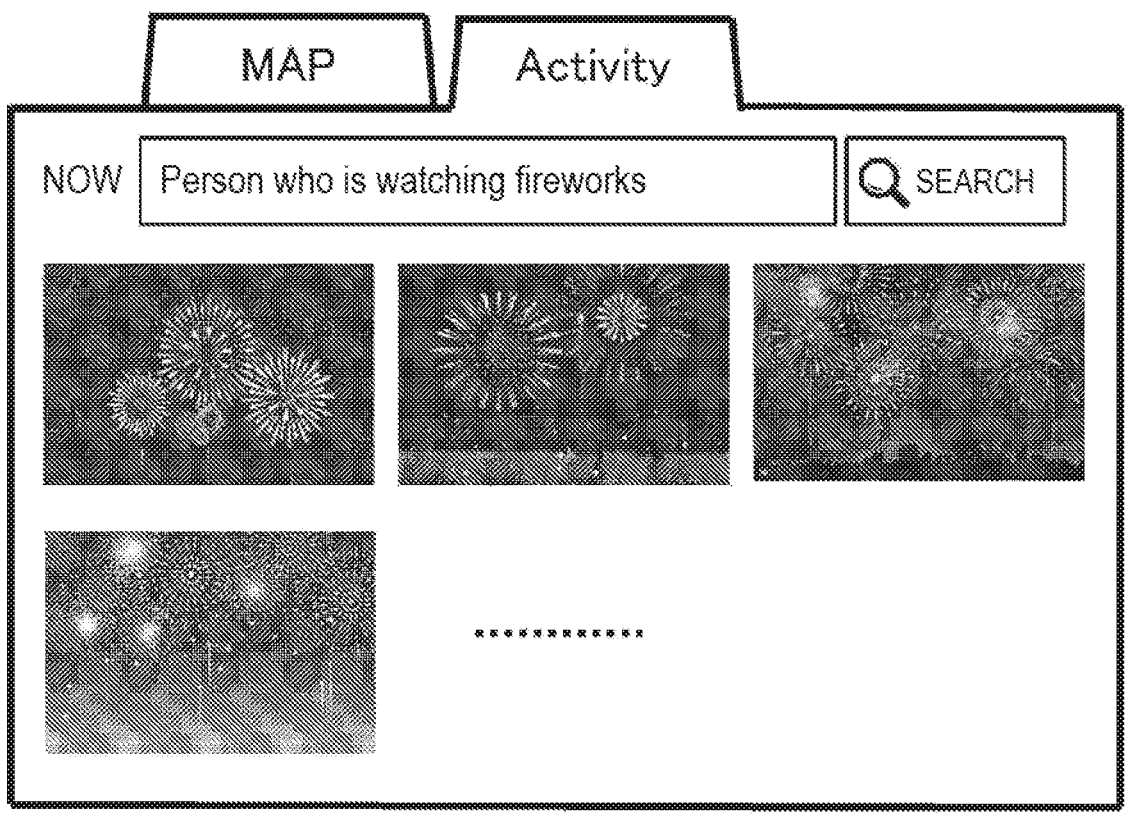
FIG. 14B illustrates a UI display example for selecting a Body.

For example, as illustrated in FIG. 14, those two types of Body selection UIs may be superimposed and the UIs may be switched by using a tab. As illustrated in FIG. 14A, when a "MAP" tab is selected, the map-based Body selection UI is displayed in front. Therefore, the Ghost can select a Body to whom the Ghost desires to perform JackIn in association with a location. Further, as illustrated in FIG. 14B, when an "Activity" tab is selected, the Body selection UI that displays thumbnails of first person views of respective Bodies in the form of a catalog is displayed in front. Therefore, the Ghost can select a Body selection UI while visually recognizing behavior of each Body.

E. Selection of Ghost by Body

In a case where a Body desires (needs) to be assisted, instructed, guided, or navigated by another person regarding operation that is currently performed, the Body invites Ghosts who perform JackIn to the Body himself/herself to assist the Body. For example, the Body may invite Ghosts by posting comments such as "Need help!", "Please teach me how to drive a vehicle.", and "Please tell me the way to ∘∘." with the use of a social networking service (SNS).

Further, a Ghost may charge for (monetize) a service to perform JackIn to assist, instruct, guide, or navigate a Body regarding the operation thereof. In such a case, a Body may also present a payable price at the time of inviting Ghosts.

Ghosts who attempt to answer invitation can refer to the Body who has issued the invitation via, for example, the UI screens illustrated in FIGS. 8 to 12. Herein, description of the UI on the Ghost side is omitted.

FIG. 15 illustrates an example of the UI that allows a Body to select a Ghost. The UI illustrated in FIG. 15 includes a list of Ghosts to be selected and displays information of each Ghost. The listed Ghosts are users who answer invitation of the Body. Alternatively, the listed Ghosts may be people who are selected by the JackIn server (provisional name) for controlling JackIn between Bodies and Ghosts in accordance with content of invitation of the Body. Each Ghost listed on the UI illustrated in FIG. 15 is, for example, a user who has specified behavior such as a "person who is watching fireworks" and applies to JackIn to a Body.

Information of the Ghosts displayed on the Ghost selection UI illustrated in FIG. 15 includes not only personal information such as age, sex, a human relationship with the Body (family or kinship relation, friend, boss and subordinate, or the like), a place of birth, an occupation, and a qualification but also rating information of a skill of assistance target operation and information such as past performance (as an assistant, instructor, or the like) (how many hours the Ghost has experienced the operation so far) and review of the Ghost, and reputation by other Bodies (posting, voting result, or the like). Further, in a case where a list of Ghosts is displayed on the Ghost selection UI, display order of the Ghosts may be sorted on the basis of correspondence between permission and mission, past performance, review, reputation, or the like. The Body can select, via the Ghost selection UI illustrated in FIG. 15, a Ghost by whom the Body desires to be, for example, assisted, instructed (coaching and the like in sport competition), guided, or navigated.

INDUSTRIAL APPLICABILITY

The foregoing thus describes the technology disclosed in this specification in detail and with reference to specific embodiments. However, it is obvious that persons skilled in the art may make modifications and substitutions to these embodiments without departing from the spirit of the technology disclosed in this specification.

The technology disclosed in the present specification can be utilized for, for example, operation support and the like in various industrial fields such as a medical site of a surgical operation and the like, a construction site of a construction work and the like, control of airplanes and helicopters, navigation of drivers of automobiles, instructions in sports, and other uses.

Further, in the present specification, an embodiment of a system in which a Ghost who shares a first person image of a Body who acts on a site with his/her body intervenes in vision, an auditory sensation, a body, or the like of the Body has been mainly described. However, the scope of the technology disclosed in the present specification is not limited thereto. It is also possible to apply the technology disclosed in the present specification to various information processing devices for displaying, on vision of a certain person, information regarding assistance, instruction, guidance, and navigation from another person.

Essentially, the technology disclosed in this specification has been described by way of example, and the stated content of this specification should not be interpreted as being limiting. The spirit of the technology disclosed in this specification should be determined in consideration of the claims.

Additionally, the technology disclosed in the present specification can also be configured as below.

(1)

An information processing device including:

a control unit configured to control connection between a first device that transmits an image and a second device that receives the image in accordance with which of the first device and the second device takes initiative.

(2)

The information processing device according to (1), in which in a case where the first device takes initiative in establishing connection with the second device, the control unit receives a connection request from the second device, notifies the first device in a standby state, and causes image transmission from the first device to the second device to start.

(3)

The information processing device according to (1), in which in a case where the second device takes initiative in establishing connection with the first device, the control unit notifies the first device of a connection request from the second device and causes image transmission from the first device to the second device to start.

(4)

The information processing device according to (1), in which in a case where the plurality of second devices take initiative in establishing connection with the first device, the control unit notifies the first device of connection requests from the plurality of second devices only in a case where the connection requests satisfy a predetermined start condition and causes image transmission from the first device to the plurality of second devices to start.

(5)

The information processing device according to any of (1) to (4), in which the control unit controls a start of image transmission from the first device to the second device and intervention in the first device by the second device.

(6)

An information processing method including:

a control step of controlling connection between a first device that transmits an image and a second device that receives the image in accordance with which of the first device and the second device takes initiative.

(7)

An information processing device including:

a selection unit configured to select a first device on a basis of position information of the first device, the first device transmitting an image to a second device.

(8)

The information processing device according to (7), in which the selection unit presents a UI that shows a position of the first device on a map.

(9)

The information processing device according to (7) or (8), in which the selection unit selects the first device further in consideration of behavior of a user.

(10)

The information processing device according to (8), in which the selection unit presents only the first device on the UI, the first device being extracted on a basis of behavior of a user.

(11)

The information processing device according to (8), in which the selection unit presents behavior of a user of the first device on the UI.

(12)

The information processing device according to (8), in which the selection unit presents information regarding intervention in the first device on the UI.

(13)

An information processing method including:

a selection step of selecting a first device on a basis of position information of the first device, the first device transmitting an image to a second device.

(14)

An information processing device including:

a selection unit configured to select a first device on a basis of behavior of a user of the first device, the first device transmitting an image to a second device.

(15)

The information processing device according to (14), in which the selection unit presents a UI that shows information regarding the image transmitted from the first device.

(16)

The information processing device according to (15), in which the selection unit presents information regarding the first device or the user of the first device on the UI.

(17)

The information processing device according to (15), in which the selection unit presents only the image on the UI, the image being transmitted from the first device extracted on the basis of the behavior of the user.

(18)

An information processing method including:

a selection step of selecting a first device on a basis of behavior of a user of the first device, the first device transmitting an image to a second device.

(19)

An information processing device including:

a selection unit configured to select a second device to which a first device transmits an image on a basis of information regarding the second device or a user of the second device.

(20)

The information processing device according to (19), in which the selection unit presents a UI that shows information regarding the second device or the user of the second device.

(21)

An information processing method including:
a selecting step of selecting a second device to which a first device transmits an image on a basis of behavior of a user of the first device.

REFERENCE SIGNS LIST 100 visual information sharing system
101 image provision device
102 image display device
501 imaging unit
502 image processing unit
503 display unit
504 first audio output unit
505 drive unit
506 second audio output unit
507 position detection unit
508 communication unit
509 control unit
510 authentication unit
511 communication unit
512 image decoding unit
513 display unit
514 user input unit
515 position posture detection unit

The invention claimed is:

1. An information processing device comprising:
at least one processor configured to:
transmit, based on a start condition set by at least one mobile device, acceptance information to at least one display device via a server, wherein the acceptance information allows the at least one display device to acquire an image that is captured by an imaging unit of the at least one mobile device;
receive, from the at least one display device which has received the acceptance information, application for connection to the at least one mobile device,
control, based on the received application, the at least one mobile device to start distribution of the image to the display device, and
allow, based on permission level settings, one or more actions performed at the display device to control movement of a body part of a user at the information processing device through a drive unit at the information processing device.

2. The information processing device according to claim 1, wherein the at least one display device includes a plurality of display devices, and,
wherein the at least one processor is configured to control the at least one mobile device to start distribution of the image to each of the plurality of display devices only in a case where the number of the plurality of display devices satisfies the set start condition.

3. The information processing device according to claim 1,
wherein the at least one mobile device is a wearable device, and
wherein the acceptance information further allows the at least one display device to control a speaker of the wearable device to output audio based on an audio input from the display device.

4. The information processing device according to claim 3,
wherein the wearable device is a head-mounted display, wherein the image is a real-time first-person-view image captured by the imaging unit of the head-mounted display, and
wherein the at least one processor is configured to control, based on the received application, the at least one mobile device to start distribution of the real-time first-person-view image to the display device.

5. An information processing method comprising:
transmitting, based on a start condition set by at least one mobile device, acceptance information to at least one display device via a server, wherein the acceptance information allows the at least one display device to acquire an image that is captured by an imaging unit of the at least one mobile device;
receiving, from the at least one display device which has received the acceptance information, application for connection to the at least one mobile device,
controlling, based on the received application, the at least one mobile device to start distribution of the image to the display device, and
allowing, based on permission level settings, one or more actions performed at the display device to effect movement of a body part of a user at the information processing device using a drive unit at the processing device.

6. At least one non-transitory computer-readable medium encoded with instructions which, when executed by at least one processor of a mobile device, cause the mobile device to:
transmit, based on a start condition set by the mobile device, acceptance information to at least one display device via a server, wherein the acceptance information allows the at least one display device to acquire an image that is captured by an imaging unit of the mobile device;
receive, from the at least one display device which has received the acceptance information, application for connection to the mobile device,
control, based on the received application, the mobile device to start distribution of the image to the display device, and
allow, based on permission level settings, one or more actions performed at the display device to effect movement of a body part of a user at the information processing device using a drive unit at the processing device.

7. The information processing device according to claim 1, further comprising the at least one processor being configured to receive a position information of a given mobile device.

8. The information processing device according to claim 7, wherein the position information comprises Global Positioning System (GPS) signals.

9. The information processing device according to claim 7, further comprising the at least one processor being configured to transmit the position information to the display device.

10. The information processing device according to claim 1, wherein the drive unit includes an actuator for applying tactile sensations or electrical simulations to the body part of the user.

11. The information processing device according to claim 1, wherein the drive unit comprises a device that drives a powered unit or exoskeleton on the body part of the user.

12. The information processing device according to claim 1, wherein the one or more actions are allowed based on a mission, the mission comprising a range of user activities permitted by the information processing device.

13. The information processing device according to claim 5, further comprising detecting position information of a given mobile device of the at least one mobile device.

14. The information processing device according to claim 13, further comprising transmitting the position information to the display device.

15. The information processing device according to claim 13, further comprising using the position information to select the given mobile device of the at least one mobile device for communicating with the display device.

* * * * *